March 17, 1959 C. E. TACK 2,877,871
ROTOR BRAKE
Filed Sept. 8, 1955 2 Sheets-Sheet 1
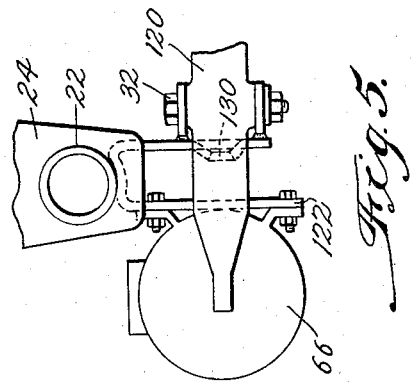
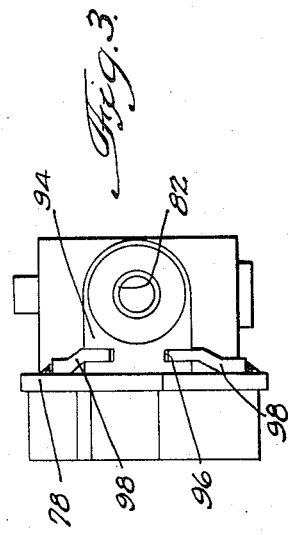
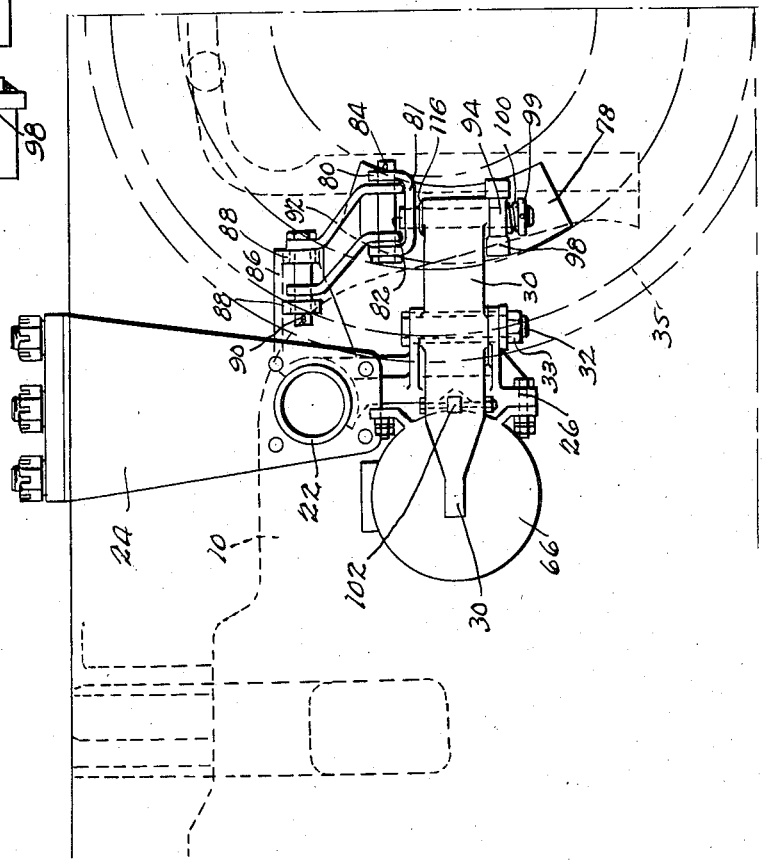
INVENTOR.
Carl E. Tack.
BY
Walter L. Schlegel, Jr.
Witness.
Ralph M. Faust March 17, 1959 — C. E. TACK — 2,877,871
ROTOR BRAKE
Filed Sept. 8, 1955 — 2 Sheets-Sheet 2
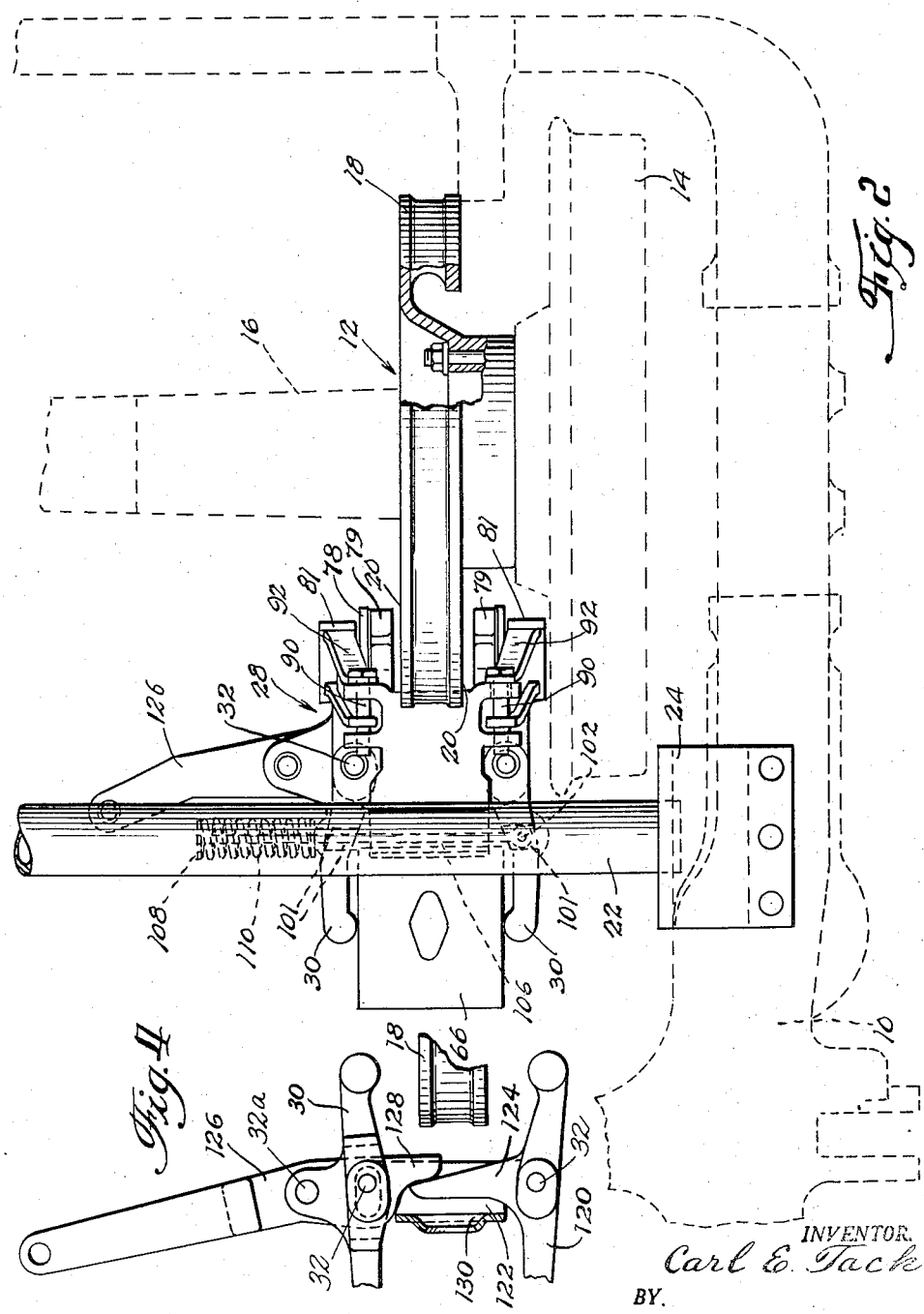
INVENTOR.
Carl E. Tack
BY Walter L. Schlegel Jr.

United States Patent Office 2,877,871
Patented Mar. 17, 1959

2,877,871
ROTOR BRAKE

Carl E. Tack, Chicago, Ill., assignor to American Steel Foundries, Chicago, Ill., a corporation of New Jersey Application September 8, 1955, Serial No. 533,154

7 Claims. (Cl. 188—59)

This invention relates to an improved arrangement in rotor brakes of the type wherein pivotal arms carry a brake head and a brake shoe in engaging relationship with opposed braking faces extending substantially radially of the axis of rotation of a rotating element.

The principal object of this invention is to provide an arrangement whereby the torque produced by the braking effort is transmitted to the frame externally of the brake mechanism rather than through the brake lever.

Another object of the invention is to provide a novel mechanism for maintaining the brake head and brake shoe in parallel alignment with the friction faces of the rotor.

Another object is to provide a torque absorbing mechanism utilizing a minimum number of parts so that the mechanism will be inexpensive to fabricate and to maintain.

Still another object is to provide means to remove the brake shoe easily and quickly for replacement of a new brake shoe without disturbing the alignment mechanism attached to the head.

Another object is to provide an arrangement wherein the brake head is free floating with both the weight of the head and the braking torque being sustained by mechanism independent of the brake lever.

Other objects and advantages will become apparent in the following specification and drawings, in which:

Figure 1 is a side elevational view showing the preferred embodiment of the invention and its relationship to the wheel and axle assembly of a vehicle on which the brake is to be used;

Figure 2 is a plan view of the embodiment illustrated in Figure 1;

Figure 3 is an auxiliary view taken laterally of the head to show clearly the mounting clips;

Figure 4 is a partial view of a typical hand brake to which the present invention may also be applied; and Figure 5 is a fragmentary side elevational view of the structure of Figure 1 modified to accommodate the hand brake arrangement.

Referring to the drawings, a frame 10 and a wheel and axle assembly, generally 12, of the particular vehicle to which the brake is to be applied are shown. The wheel and axle assembly consists of a wheel 14 rigidly secured to an axle 16 which is journaled at each end by suitable bearings (not shown). It will be obvious, however, to those skilled in the art that a fixed axle and a wheel rotatable on the axle could be utilized if desired. A rotor 18, which is preferably in the form of a circular disk, is secured to the wheel for rotation therewith. The rotor is provided with opposed friction braking faces 20 which, in this particular type of brake, are preferably substantially radial to the axis of rotation of the wheel and rotor. In some instances the friction faces have been incorporated in the wheel itself and the rotor completely eliminated. However, the faces tend to wear from constant use, and it is often desirable to incorporate heat dissipating means in the rotor. Due to these circumstances it is generally advantageous to utilize a rotor separate and distinct from the wheel. Only one end of the axle with its rotor and wheel and accompanying brake mechanism are shown in the drawings, it being understood that all of these parts may be duplicated at the opposite end of the axle.

Rigidly secured to the frame by means of a pair of straps 24, only one of which is shown, is a transverse member or beam 22. This member is preferably located radially adjacent and in close proximity to the wheels 14. Welded or otherwise secured to the transverse member 22 and approximately radial each rotor is a support bracket 26. All of the various components of the brake mechanism, which will be hereinafter described, are carried by either the transverse member itself or by the support bracket.

The brake mechanism, generally designated 28, is comprised of a pair of brake levers 30 pivotally mounted on pivot pins 32 which are secured to an extension of the bracket 26. Pin 32 may be in the form of a bolt secured by a nut 33 but, if desired, any other conventional type of pin retaining means, such as taper pins or set screws, might be used. Corresponding ends of the brake levers extend to embrace the rotor adjacent the friction faces. It is conceivable, of course, that one brake lever could be used, but generally, it would be preferable to use a pair of levers so that the braking forces would be opposed and thereby tend to counterbalance each other.

Pivotally attached to the brake lever and adjacent the friction face 20 is a brake head 78 carrying a brake shoe 79 and provided toward its upper end with a U-shaped lug 80 having its closed portion 81 facing in a downward direction. The pivot pin 82, seen in Figure 1, extends transversely of the head and parallel to the fulcrum 32 of the brake lever and is secured to the brake lever 30 and provides a pivotal connection with the brake lug 80. A lower pivot pin 84 disposed generally perpendicular to the pin 82 is carried by the lug 80. Secured to the transverse member 22 is a horizontally projecting support member 86 positioned approximately in the radial plane of the rotor 18 and extending toward the rotor to a point intermediate the pivotal connection 82 and the fulcrum pin 32 of the brake lever. Integral with the projecting member 86 are a pair of lugs 88 which support an upper pivot pin 90 which is disposed approximately parallel to the lower pivot pin 84. Pivot pins 84 and 90 are preferably held in place by cotter pins (not shown). Connecting the pivot pins 84 and 90 is a hanger 92 in the form of an off-set link, as best seen in Figure 1, by which the entire weight of the brake head and shoe is supported. It should be noted that the closed portion 81 of the lug 80 is spaced from the brake lever 30 to accommodate the motion in a vertical direction of the brake head relative to the brake lever which results from the fact that the brake head is swinging on an arcuate path about the upper pivot pin 90 when the brakes are actuated or released. Similarly, clearance is provided between the offset link 92 and the lug 80 to accommodate relative motion of the link and lug which is caused by the arcuate movement of the brake lever 30 when pivoting about the pivot pin 32. The pivot pin 82 extends downwardly from the brake lever 30 and carries a detachable collar 94 having a pair of opposed slots 96 which accommodate clips 98 which in turn are preferably welded to the brake head 78. The purpose of the collar and clips is to position the lower portion of the brake head to maintain a substantially parallel relationship between the brake shoe and the friction surface of the rotor. A collar 99 is fastened as by a set screw or taper pin to the lower end of the pivot pin 82 and a spring 100 surrounds the pivot pin and is interposed between the collar 99 and the detachable collar 94. The purpose of the collar 99 and the spring 100 is to hold the detachable collar 94 in position against the lower portion of the brake lever 30.

One of the functions of the novel hanger assembly is to support the entire weight of the brake head and shoe thus relieving this load from the brake lever and its related parts. The second important function of the hanger is to act as a tension or compression member in transmitting the braking torque through the support member 86 into the beam 22 and therefrom into the vehicle frame. Generally, when brakes of this type are applied, the frictional braking force, which is in a direction tangentially of the rotor, tends to similarly move the brake head and shoe. This force is transmitted as a torque through the brake lever and its pivotal attachment. Add to this the weight of the brake head and shoe and it can be seen that a considerable load is imposed on the lever mechanism. These forces not only result in occasional faulty brake action but also necessitate an expensive, heavy pivotal mounting. The hanger 92, which is disposed in line and substantially parallel to the direction of the braking force, transfers these transverse stresses to the beam. Furthermore, clearance has been provided between the brake lever 30 and the lug 80 so that even though some lateral motion of the brake head may occur, none of the weight of the head and shoe will be carried by the lever but rather will be taken by the hanger 92. A certain amount of this lateral motion is caused by the head being supported by a swinging link, the lower end of which moves in an arcuate path and imparts a vertical motion to the head and shoe relative to the brake lever when the brakes are applied or released. Not only is the operating efficiency of the brake mechanism thereby increased, but the pivot pin 32 and its supporting bracket may be made smaller and lighter and less expensive. The third important function of the hanger is to assist in maintaining parallelism between the brake shoe and the friction braking surface of the rotor. Most of the devices which are used to accomplish this are not only complicated and costly but also have a tendency to become jammed. The present invention maintains parallelism by the use of a pair of pivot pins (82 and 84) disposed at right angles to each other. The pivot pin 82 prevents rotation of the brake head transversely of the rotor while the pivot pin 84 prevents rotation radially of the rotor. Furthermore, this combination of one horizontal pin substantially perpendicular to a second vertical pin is effective without hampering the proper functioning of the brake mechanism.

Mounted on bracket 26 and positioned between the ends of the brake levers 30, which are opposite pivot pins 32 as compared to the brake heads 78, is a duplex type fluid responsive cylinder 66. This cylinder is provided internally with opposed pistons so that when the fluid line is actuated, the cylinder will exert pressure simultaneously and equally against both of the brake levers, thereby bringing the brake shoes on both sides of the rotor into braking contact with the friction surfaces 20. As this type of cylinder is common in the art, its internal construction is not deemed necessary to be shown on the drawings.

The brakes are returned to nonoperating position by means of spring 110. Generally the release spring is positioned between the brake levers. However, when so positioned, in order for the outer periphery of the spring to clear the cylinder 66 the axis of the spring must be moved toward the fulcrum of the brake lever, thereby shortening the moment arm of the spring force. One possible solution would be to move the spring off the center line of the lever and increase the moment arm by taking advantage of the curving periphery of the cylinder, but this solution has the disadvantage of producing a biased force on the lever. Figure 2 illustrates a release spring which is disposed outwardly of one of the levers, and the connection made to the other lever by a rod of a smaller diameter which can be placed immediately adjacent the cylinder and on the center line of the brake lever. With this type of construction the line of action of the release spring can be maintained at a point of maximum distance from the fulcrum of the lever, and furthermore, the force exerted by the release spring does not produce a twisting effect on the brake levers as would be the case when the spring is mounted below the center line of the levers. Referring to Figure 2, a pair of horizontally aligned openings 101 are provided in the brake levers. Carried in one of the levers and passing through the opening 101 is a vertical pin 102. Pivotally attached to the pin 102 and extending through and beyond the aligned opening in the other lever is a rod 106. At the outer end of the rod there is secured a retaining collar 108. Surrounding the rod and disposed between the retaining collar 108 and the closer brake lever, there is provided a spring 110 which urges the collar, rod, and one of the levers in one direction and simultaneously urges the other lever in a direction opposite thereto. This type of spring release could not practically be used where a cylinder housing was included in the assembly but is readily adaptable to the proposed construction wherein the cylinder and the levers are merely suspended on a bracket carried by a transverse beam.

As mentioned heretofore, when a brake force is applied to the rotor, the frictional force between the rotor and the brake shoe tends to move the brake assembly in the direction of rotation of the rotor. This action places a torque load on the brake lever of a conventionally designed brake which is extremely undesirable. Not only must the brake lever be made heavier and stronger in order to resist the torque, but also the effective action of the brake mechanism is impaired. It is desirable, therefore, to provide some other mechanism which will transmit the braking torque directly to the frame of the vehicle and eliminate it completely from the brake lever. This invention provides an effective and inexpensive means for accomplishing this objective. In the disclosed structure the torque load is transmitted from the brake head to the hanger 92, which is substantially parallel to the brake head, and thence through the projection 86 and transverse member 22 to the frame proper of the vehicle. The brake lever can therefore be designed to withstand only those forces which are normal to the friction surfaces of the rotor.

When pivoted only to the brake lever, the brake head is free to rotate so that its radially outermost edge can move either closer to or further from the friction surface than its radially innermost edge. When this condition exists, it is possible for the radially outermost edge of the brake shoe to wear more rapidly than the remainder of the shoe due to the greater peripheral speed of the rotor at a point more remote from the axis of rotation. To obtain longer shoe life, it is desirable to maintain the brake head and brake shoe at all times approximately parallel to the friction surface of the rotor. This is effectively accomplished by the same mechanism which restrains the transverse braking torque. With the projection 86 and the link 92 being rigid in the direction approximately radial of the rotor and with the pivot pin 84 being positioned with the same alignment, it can be seen that the brake head is effectively prevented from rotating and is held substantially parallel to the friction faces of the rotor. As a result uniform brake shoe wear will always be obtained.

It is apparent that by using an off-set link and providing a detachable collar below the brake lever that the brake head and shoe can be easily disassembled without disturbing the brake lever assembly. Disassembly is accomplished, for example, simply by removing pivot pin 90 and then lifting the assembly comprising the link 92, the brake head 78 and the shoe 79 in a vertical direction off of the pin 82. The clips 98 are simultaneously readily disengaged from the slots 96. This ease of disassembly and similar ease of assembly greatly facilitates the replacement of a brake shoe, for example, whenever such replacement is required. It should be noted that disassembly could also easily be accomplished by removing the lower pivot pin 84 and lifting off only the brake head and brake shoe.

By utilizing a suspension system wherein the brake head is carried by a swinging link pivoted at its upper end, it is possible to incorporate in the mechanism novel means for removing ice from the pivotal connection between the brake lever and the brake head which might otherwise adversely affect the braking operation. Referring to Figure 1, it is seen that the upper portion of the brake lever which is spaced slightly from the lug 80 forms a frusto-conical surface 116. When the brakes are applied or released, the brake head moves in an arc and will therefore move vertically relative to the brake lever. This motion will alternately increase and decrease the distance between the surface 116 and the lug 80, and any ice which may be formed will be pushed outwardly and ejected.

The invention disclosed herein can also be utilized on hand brake applications. Figure 4 illustrates a typical hand brake mechanism wherein a brake lever 120, being one of a pair of opposed brake levers, is pivotally mounted on a backing plate 122 (Figure 5), which corresponds to bracket 26, and is provided with an arm 124 projecting to a point radially of the rotor 18. Pivotally mounted on the opposed lever is a hand brake actuating lever 126 which is provided with an arm 128 also extending to a point radially adjacent the rotor 18 and engageable with the arm 124 of the lever 120. The brake means for these brake levers are identical with those described hereinbefore relative to Figures 1 through 4. The backing plate 122 is provided with an opening 130 radially adjacent the rotor 18 and immediately behind the engagement point of the arms 124 and 128. When the hand brake lever is moved to actuate the brakes, the arm 128 will move in a clockwise direction, as seen in Figure 4, and will urge the arm 124 in a counterclockwise direction toward the opening 130. Any ice which may be formed behind the arms will therefore be forced through the opening 130 and ejected and will not be able to jam the brake mechanism as might be the case if the opening 130 were not provided.

I claim:

1. In a brake arrangement for a railway car truck having a truck structure supported by a wheel and axle assembly including a brake surface in a vertical plane, the combination of a transverse cross member carried by said structure, a brake lever fulcrumed to said member about a vertical axis, means carried by said member for operating the brake lever, a hanger support secured to said member and disposed longitudinally intermediate said member and said brake surface, a hanger pivoted to said support on an axis approximately perpendicular to the fulcrum axis of said brake lever and parallel to the plane of the brake surface, the lower portion of said hanger being offset to a point adjacent said brake surface, a brake head having a pivotal connection to said hanger on an axis approximately parallel to the second mentioned axis, said connection being the sole support for said brake head, and a pivotal connection about an axis parallel to said first mentioned axis between the head and the lever, either of said pivotal connections accommodating disassembly and removal of said head in a substantially vertical direction.

2. A brake arrangement according to claim 1, wherein said last mentioned pivotal connection comprises a lug secured to said head toward the upper end thereof and spaced from the brake lever, a pivot pin secured in said brake lever and received in said lug, a detachable collar mounted on said pin below said brake lever, and retaining means for said collar.

3. A brake arrangement for a railway car truck having truck structure supported by a wheel and axle assembly having a brake surface in a vertical plane, said arrangement comprising: a brake lever pivoted on a vertical axis to the truck; a vertically disposed pivot pin in said brake lever adjacent said surface; a brake head pivoted on said pin; a lug carried by said brake head above and spaced from said lever and having an opening for receiving said pivot pin; a horizontal disposed support pin carried by said lug; a hanger lever pivoted on horizontal axes to the truck and to said support pin for supporting said brake head whereby a vertical component of motion is imparted to said brake head when the brake arrangment is operated; and a frustro-conical surface on said brake lever adjacent to and spaced from said lug for removing ice which may at times form between said lever and said lug.

4. In a hand brake arrangement for a railway car truck having a truck structure supported by a wheel and axle assembly and including brake surfaces and a pair of opposed brake levers associated therewith, a mounting plate carried by said structure, said plate having an opening therethrough in a direction radially of said brake surfaces, one of said brake levers being mounted on said plate and having an arm extending to a point adjacent said opening, a hand brake lever mounted on said opposing lever and having an arm engageable with said first mentioned arm for moving said first mentioned arm toward said opening upon actuation of said levers whereby any ice which may be formed between said first mentioned arm and said opening will be forced through said opening.

5. A brake arrangement for a vehicle having a frame and a wheel and axle assembly including a brake surface in a vertical plane, said arrangement comprising: a frame member horizontally spaced from said surface; a brake lever pivoted to said frame member on a vertical axis; a brake head pivoted to said brake lever on a vertical axis; a laterally offset support link pivoted on a horizontal axis to said lever adjacent said surface and pivoted on a horizontal axis to said frame member at a point intermediate said member and said brake surface; said link accommodating, upon disassembly of said link and frame member, removal thereof and of said brake head in a vertical direction without disturbing said brake lever.

6. In a hand brake arrangement for a railway car truck having a truck structure supported by a wheel and axle assembly including a substantially vertically disposed brake surface, a mounting plate carried by said structure and having an opening therethrough; a pair of brake levers pivoted on vertical axes to said plate laterally of said opening; an arm on one of said levers extending toward the other lever and adjacent said opening; a hand brake lever mounted on said other lever for actuating the latter; an arm on said hand brake lever engageable with said first mentioned arm for moving the latter toward said opening and for actuating said other lever when said hand brake lever is operated.

7. A hand brake arrangement for a railway car truck having a truck structure supported by a wheel and axle assembly including substantially vertically disposed brake surface, the combination of: a mounting plate carried by said structure in a vertical plane laterally thereof, said plate having an opening therethrough, the axis of said opening being substantially parallel and coplanar with said brake surfaces; a pair of brake levers pivoted on vertical axes to said plate on either side of said opening; an arm on one of said levers extending across said opening toward the other of said levers; a hand brake lever mounted on said other lever for actuating the latter; an arm on said hand brake lever engageable with said first mentioned arm for moving the latter toward said opening and for actuating said one lever when said hand brake lever is operated.

References Cited in the file of this patent
UNITED STATES PATENTS

| | | |
|---|---|---|
| 343,680 | Tribe | June 15, 1886 |
| 784,321 | Haddock | Mar. 7, 1905 |
| 1,779,776 | Masion | Oct. 28, 1930 |
| 2,142,417 | Sale | Jan. 3, 1939 |
| 2,174,401 | Farmer | Sept. 26, 1939 |
| 2,274,859 | Eksergian | Mar. 3, 1942 |
| 2,383,376 | Gaenssle | Aug. 21, 1945 |